(12) United States Patent
Sridharan et al.

(10) Patent No.: US 9,262,851 B2
(45) Date of Patent: Feb. 16, 2016

(54) HEAT MAPPING OF DEFECTS IN SOFTWARE PRODUCTS

(71) Applicant: ORACLE INTERNATIONAL CORPORATION, Redwood Shores, CA (US)

(72) Inventors: Anandhi Sridharan, Bangalore (IN); Alok Kumar, Plymouth, MN (US); Amit Sinha, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/287,443

(22) Filed: May 27, 2014

(65) Prior Publication Data

US 2015/0348294 A1 Dec. 3, 2015

(51) Int. Cl.
- G06F 9/44 (2006.01)
- G06T 11/20 (2006.01)
- G06T 11/00 (2006.01)

(52) U.S. Cl.
CPC .............. *G06T 11/206* (2013.01); *G06F 8/33* (2013.01); *G06F 8/34* (2013.01); *G06T 11/001* (2013.01); *G06T 2207/20072* (2013.01)

(58) Field of Classification Search
CPC ..................................... G06F 8/34; G06F 8/33
USPC ................................................. 717/107, 110
See application file for complete search history.

(56) References Cited

U.S. PATENT DOCUMENTS

| | | | |
|---|---|---|---|
| 6,526,524 B1 * | 2/2003 | Kelley | 714/38.1 |
| 8,924,935 B1 * | 12/2014 | Chopra et al. | 717/124 |
| 2006/0156077 A1 * | 7/2006 | Altaf et al. | 714/57 |
| 2010/0023928 A1 * | 1/2010 | Hentschel et al. | 717/124 |
| 2010/0039433 A1 | 2/2010 | McGreevy et al. | |
| 2011/0141136 A1 | 6/2011 | Cardno et al. | |

(Continued)

FOREIGN PATENT DOCUMENTS

| | | |
|---|---|---|
| WO | 2008011065 | 1/2008 |
| WO | 2008020182 | 2/2008 |
| WO | 2013095333 | 6/2013 |

OTHER PUBLICATIONS

Cognimatics; TrueView Heatmap-manual; Camera-Based Heatmap, Product Overview, Cognimatics Industrial Applications, downloaded from http://face.cognimatics.com/downloads/axis/heatmap/manualTVH2AxisCam.pdf, pp. 1-4; downloaded on Apr. 24, 2014; Cognimatics, Lund Sweden.

(Continued)

*Primary Examiner* — Phillip H Nguyen
(74) *Attorney, Agent, or Firm* — Kraguljac Law Group, LLC (57) ABSTRACT

Systems, methods, and other embodiments associated with heat mapping of defects in software components are described. In one embodiment, a method includes receiving feedback data that describes errors reported from a software product, wherein the software product includes components. Records are retrieved that are associated with the errors reported, where a record links an error to a defect in a component from the software product. A heat map is generated that has regions assigned to represent different components from the software product. Graphical elements are generated and added to a region for each defect identified in a corresponding component, where a size of a visual area of the region is based, at least in part, on a number of graphical elements contained in the region.

20 Claims, 9 Drawing Sheets

(56) References Cited

U.S. PATENT DOCUMENTS

| | | | |
|---|---|---|---|
| 2011/0321007 A1* | 12/2011 | Marum et al. | 717/113 |
| 2012/0166884 A1* | 6/2012 | John et al. | 714/38.1 |
| 2013/0014084 A1* | 1/2013 | Sahibzada et al. | 717/124 |
| 2013/0027227 A1* | 1/2013 | Nordstrom | 340/990 |
| 2013/0311968 A1* | 11/2013 | Sharma | 717/101 |
| 2013/0311972 A1* | 11/2013 | Supplisson et al. | 717/121 |
| 2014/0074452 A1* | 3/2014 | Carmi | 703/22 |

OTHER PUBLICATIONS

AGENTvi; AGENTvi Comprehensive Video Analytics Solutions; Video Analytics Applications for the Retail Market; downloaded from http://www.agentvi.com/images/Agent_Vi_-_Retail_Applications.pdf; pp. 1-8; downloaded on Apr. 24, 2014.

* cited by examiner

FIG. 1

| Heat Map 200 ||||||||||||||||||
|---|---|---|---|---|---|---|---|---|---|---|---|---|---|---|---|---|---|
| Region 210 |||||||| Region 220 ||||| Region 230 |||||
| 301 | 302 | 303 | 304 | 305 | 306 | 307 | 308 | Sub-region 221 ||||| Sub-region 231 |||||
| 309 | 310 | 311 | 312 | 313 | 314 | 315 | 316 | 357 | 358 | 359 | 360 | 361 | 372 | 373 | 374 | 375 | 376 |
| 317 | 318 | 319 | 320 | 321 | 322 | 323 | 324 | 362 | 363 | 364 | 365 | 366 | 377 | 378 | 379 | 380 | 381 |
| 325 | 326 | 327 | 328 | 329 | 330 | 331 | 332 | Sub-region 222 ||||| 382 | 383 | 384 | 385 | 386 |
| 333 | 334 | 335 | 336 | 337 | 338 | 339 | 340 | 367 | 368 | 369 | 370 | 371 | 387 | 388 | 389 | 390 | 391 |
| 341 | 342 | 343 | 344 | 345 | 346 | 347 | 348 ||||||| 392 | 393 | 394 | 395 | 396 |
| 349 | 350 | 351 | 352 | 353 | 354 | 355 | 356 | Region 250 ||||||||||
| Region 240 |||||||| Sub-region 251 ||||| Sub-region 252 |||||
| 397 | 398 | 399 | 400 | 401 | 402 | 403 | 404 | 437 | 438 | 439 | 440 | 441 | 462 | 463 | 464 | 465 | 466 |
| 405 | 406 | 407 | 408 | 409 | 410 | 411 | 412 | 442 | 443 | 444 | 445 | 446 | 467 | 468 | 469 | 470 | 471 |
| 413 | 414 | 415 | 416 | 417 | 418 | 419 | 420 | 447 | 448 | 449 | 450 | 451 | 472 | 473 | 474 | 475 | 476 |
| 421 | 422 | 423 | 424 | 425 | 426 | 427 | 428 | 452 | 453 | 454 | 455 | 456 | 477 | 478 | 479 | 480 | 481 |
| 429 | 430 | 431 | 432 | 433 | 434 | 435 | 436 | 457 | 458 | 459 | 460 | 461 | 482 | 483 | 484 | 485 | 486 |

FIG. 2

| Heat Map 600 |
|---|
| First Version 601 |

| Region 210 |||||||| Region 220 ||||| Region 230 |||||
|---|---|---|---|---|---|---|---|---|---|---|---|---|---|---|---|---|
| 301 | 302 | 303 | 304 | 305 | 306 | 307 | 308 | Sub-region 221 ||||| Sub-region 231 |||||
| 309 | 310 | 311 | 312 | 313 | 314 | 315 | 316 | 357 | 358 | 359 | 360 | 361 | 372 | 373 | 374 | 375 | 376 |
| 317 | 318 | 319 | 320 | 321 | 322 | 323 | 324 | 362 | 363 | 364 | 365 | 366 | 377 | 378 | 379 | 380 | 381 |
| 325 | 326 | 327 | 328 | 329 | 330 | 331 | 332 | Sub-region 222 ||||| 382 | 383 | 384 | 385 | 386 |
| 333 | 334 | 335 | 336 | 337 | 338 | 339 | 340 | | | | | | 387 | 388 | 389 | 390 | 391 |
| 341 | 342 | 343 | 344 | 345 | 346 | 347 | 348 | 367 | 368 | 369 | 370 | 371 | 392 | 393 | 394 | 395 | 396 |
| 349 | 350 | 351 | 352 | 353 | 354 | 355 | 356 | Region 250 ||||||||||
| Region 240 |||||||| Sub-region 251 ||||| Sub-region 252 |||||
| 397 | 398 | 399 | 400 | 401 | 402 | 403 | 404 | 437 | 438 | 439 | 440 | 441 | 462 | 463 | 464 | 465 | 466 |
| 405 | 406 | 407 | 408 | 409 | 410 | 411 | 412 | 442 | 443 | 444 | 445 | 446 | 467 | 468 | 469 | 470 | 471 |
| 413 | 414 | 415 | 416 | 417 | 418 | 419 | 420 | 447 | 448 | 449 | 450 | 451 | 472 | 473 | 474 | 475 | 476 |
| 421 | 422 | 423 | 424 | 425 | 426 | 427 | 428 | 452 | 453 | 454 | 455 | 456 | 477 | 478 | 479 | 480 | 481 |
| 429 | 430 | 431 | 432 | 433 | 434 | 435 | 436 | 457 | 458 | 459 | 460 | 461 | 482 | 483 | 484 | 485 | 486 |

| Second Version 602 |
|---|

| Region 210 |||||| Region 220 ||| Region 240 |||||||||
|---|---|---|---|---|---|---|---|---|---|---|---|---|---|---|---|---|---|
| 487 | 488 | 489 | 490 | 491 | 492 | Sub-region 221 ||| 535 | 536 | 537 | 538 | 539 | 540 | 541 | 542 | 543 |
| 493 | 494 | 495 | 496 | 497 | 498 | | | | 544 | 545 | 546 | 547 | 548 | 549 | 550 | 551 | 552 |
| 499 | 500 | 501 | 502 | 503 | 504 | 529 | 530 | 531 | 553 | 554 | 555 | 556 | 557 | 558 | 559 | 560 | 561 |
| 505 | 506 | 507 | 508 | 509 | 510 | 532 | 533 | 534 | 562 | 563 | 564 | 565 | 566 | 567 | 568 | 569 | 570 |
| 511 | 512 | 513 | 514 | 515 | 516 | Region 250 ||||||||||||
| 517 | 518 | 519 | 520 | 521 | 522 | Sub-region 253 ||||||||||||
| 523 | 524 | 525 | 526 | 527 | 528 | 571 | 572 | 573 | 574 | 575 | 576 | 577 | 578 | 579 | 580 | 581 | 582 |

FIG. 3

| Heat Map 700 |||||||||||||||||
|---|---|---|---|---|---|---|---|---|---|---|---|---|---|---|---|---|
| First User 701 |||||||||||||||||
| Region 210 |||||||| Region 220 ||||| Region 230 |||||
| 301 | 302 | 303 | 304 | 305 | 306 | 307 | 308 | Sub-region 221 ||||| Sub-region 231 |||||
| 309 | 310 | 311 | 312 | 313 | 314 | 315 | 316 | 357 | 358 | 359 | 360 | 361 | 372 | 373 | 374 | 375 | 376 |
| 317 | 318 | 319 | 320 | 321 | 322 | 323 | 324 | 362 | 363 | 364 | 365 | 366 | 377 | 378 | 379 | 380 | 381 |
| 325 | 326 | 327 | 328 | 329 | 330 | 331 | 332 | Sub-region 222 ||||| 382 | 383 | 384 | 385 | 386 |
| 333 | 334 | 335 | 336 | 337 | 338 | 339 | 340 ||||||| 387 | 388 | 389 | 390 | 391 |
| 341 | 342 | 343 | 344 | 345 | 346 | 347 | 348 | 367 | 368 | 369 | 370 | 371 | 392 | 393 | 394 | 395 | 396 |
| 349 | 350 | 351 | 352 | 353 | 354 | 355 | 356 | Region 250 ||||||||||
| Region 240 |||||||| Sub-region 251 ||||| Sub-region 252 |||||
| 397 | 398 | 399 | 400 | 401 | 402 | 403 | 404 | 437 | 438 | 439 | 440 | 441 | 462 | 463 | 464 | 465 | 466 |
| 405 | 406 | 407 | 408 | 409 | 410 | 411 | 412 | 442 | 443 | 444 | 445 | 446 | 467 | 468 | 469 | 470 | 471 |
| 413 | 414 | 415 | 416 | 417 | 418 | 419 | 420 | 447 | 448 | 449 | 450 | 451 | 472 | 473 | 474 | 475 | 476 |
| 421 | 422 | 423 | 424 | 425 | 426 | 427 | 428 | 452 | 453 | 454 | 455 | 456 | 477 | 478 | 479 | 480 | 481 |
| 429 | 430 | 431 | 432 | 433 | 434 | 435 | 436 | 457 | 458 | 459 | 460 | 461 | 482 | 483 | 484 | 485 | 486 |
| Second User 702 |||||||||||||||||
| Region 210 ||||||| Region 220 |||| Region 240 ||||||
| 487 | 488 | 489 | 490 | 491 | 492 | 493 | 494 | 495 | Sub-region 221 ||| 556 | 557 | 558 | 559 | 560 | 561 |
| 496 | 497 | 498 | 499 | 500 | 501 | 502 | 503 | 504 |  |||  562 | 563 | 564 | 565 | 566 | 567 |
| 505 | 506 | 507 | 508 | 509 | 510 | 511 | 512 | 513 | 550 | 551 | 552 | 568 | 569 | 570 | 571 | 572 | 573 |
| 514 | 515 | 516 | 517 | 518 | 519 | 520 | 521 | 522 | 553 | 554 | 555 | 574 | 575 | 576 | 577 | 578 | 579 |
| 523 | 524 | 525 | 526 | 527 | 528 | 529 | 530 | 531 |   |   |   | 580 | 581 | 582 | 583 | 584 | 585 |
| 532 | 533 | 534 | 535 | 536 | 537 | 538 | 539 | 540 |   |   |   | 586 | 587 | 588 | 589 | 590 | 591 |
| 541 | 542 | 543 | 544 | 545 | 546 | 547 | 548 | 549 |   |   |   | 592 | 593 | 594 | 595 | 596 | 597 |

HEAT MAPPING OF DEFECTS IN SOFTWARE PRODUCTS

BACKGROUND

Software products are sold by vendors to various customers across multiple geographies. A software product is a complex amalgamation of components which may or may not have subcomponents. For the software product to function correctly, the components and subcomponents, which are dependent on one another, ought to function correctly. For example, a component may be dependent on hierarchically related subcomponents. However, due to the complexity of software products, the components and/or subcomponents invariably have defects, which may cause other components not to function properly.

Customers using the software product may experience errors (e.g., bugs, program faults, coding errors) caused by the defects. The source of a defect is typically a specific component or subcomponent of the software product. Likewise, a defect typically affects a specific component or subcomponent. The likelihood that the component or subcomponent will require a remedy, such as a software patch, increases with the number of defects that the component or subcomponent has.

Customers' feedback informs a vendor of the errors that the customer has experienced while using the vendor's software product. The vendor combines the customers' feedback using traditional measurements (e.g., bar graphs, stacked graph, defect trend lines) in order to assess the kinds of problems that customers are experiencing with the software product. However, traditional measurements do not visually represent that components and/or subcomponents are arranged in a hierarchical fashion. For example, a bar graph may show the number of defects that components and subcomponents have, but not how components and subcomponents are interrelated. Likewise, traditional measurements do little to predict components that will require remedy or expose the size of problems in components relative to the software product as a whole. Accordingly, traditional measurements do not convey the full effect of a defect on the software product.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or that multiple elements may be designed as one element. In some embodiments, an element shown as an internal component of another element may be implemented as an external component and vice versa. Furthermore, elements may not be drawn to scale.

FIG. 3 illustrates one embodiment of a heat map associated with communicating defect density in components and/or subcomponents across versions of the software product.

DETAILED DESCRIPTION

Systems and methods are described herein that leverage heat map technology to communicate defect density of a software product at the component and/or subcomponent level in order to improve the quality of the software product. The software product includes components, which may or may not have subcomponents, arranged in a hierarchical fashion. The components and subcomponents make up functional modules within the software product. For example, a retail merchandising software product may include a purchasing component, an item component, and an inventory component. The purchasing component may include subcomponents such as a purchase order subcomponent, a sales order subcomponent, an accounts payable subcomponent, and so on. In general, a subcomponent provides additional functionality to a component, which the component relies upon in order to perform certain functions. With the present systems and methods, business value may be provided in the ability to analyze data across multiple parameters or dimensions such as components, defect severity, code units, customers, and/or other parameters as desired.

In one embodiment, the hierarchical structure of the software product is visually represented in a heat map that is generated for the software product. Specifically, by virtue of designing the software product, the components and subcomponents are known and can be mapped to regions and sub-regions. For example, a software product having four components may be visually represented as four regions in the heat map, each occupying a quadrant of the heat map. Subcomponents are represented as sub-regions nested within the regions. In the example given, a purchasing component may be represented as a region formed by three sub-regions. In the region representing the purchasing component, each sub-region represents a subcomponent of the purchasing component.

Therefore, the hierarchical structure of the software product is visually represented by nesting regions and sub-regions of the heat map. In one embodiment as described herein, defects, which are reported by customers as errors, are represented by elements contained within the regions and sub-regions. Accordingly, an individual viewing the heat map can visually assess the relative number of defects of the components and subcomponents, referred to as the defect density.

Figure 1:
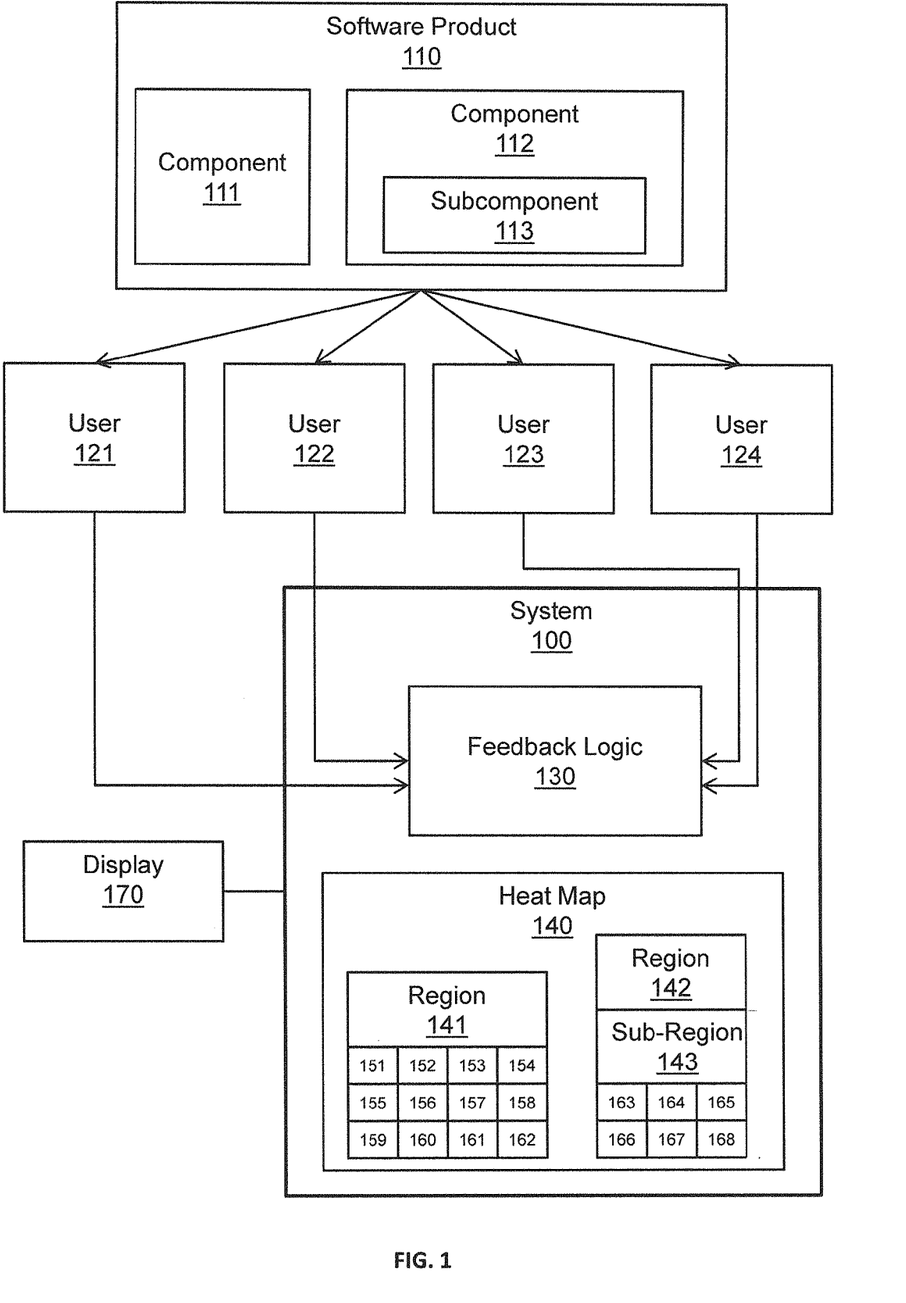
FIG. 1 illustrates one embodiment of a system for displaying a heat map that is associated with communicating defect density.

FIG. 1 illustrates one embodiment of a system 100 for generating a heat map 140 that is associated with communicating defect density in a software product 110. For purposes of explanation, the software product 110, as discussed, includes components 111 and 112. Of course, the software product 110 may include many components. Also, consider that the component 112 includes subcomponent 113, which is nested within the component 112. Therefore, the component 112 has a hierarchical relationship with the subcomponent 113 (e.g., component 112 depends on one or more functions from subcomponent 113).

Also for purposes of explanation, suppose a group of users (e.g., users 121, 122, 123, and 124) are customers that use the software product 110. The users are instructed to provide feedback data to the vendor of the software product about their experience with executing/operating the software product 110. The feedback data may be communicated over a network and collected by feedback logic 130. For example, the users 121, 122, 123, and 124 provide feedback about errors that the users 121, 122, 123, and 124 have experienced while executing the software product 110. While four users are illustrated, any number of users may provide feedback about the software product 110. A user may also be an employee of the vendor testing the software product 110 for errors in order to find defects.

In some instances, the software product 110 may perform a function incorrectly due to a programming defect, which may not cause an actual error in the software. Rather, such a defect would be observed by someone operating the software. Alternatively, a computer or computer storage medium executing the software product 110 may be programmed to automatically report errors to the vendor via the feedback logic 130. In one embodiment, when an error is generated by the software product 110, the software product 110 transmits data regarding the error to the feedback logic 130 using computer communication.

In one embodiment, the system 100 is a computing device configured with feedback logic 130. The feedback data is received and collected by the feedback logic 130. The feedback data may include errors reported by the users, as well as, the operation being performed when the error occurred and the consequences of the reported error. The feedback logic 130 analyzes the feedback data and identifies defects in the software product 110 at the component level (e.g., in components 111 and 112 as well as the subcomponent 113) to determine which component has the defect responsible for the reported error. Through various observations of the software product in execution, errors are determined to be caused by defects in components. These observations in addition to the information used to build the software product are used to create records that identify the location of a defect in a component or subcomponent.

For example, it may be determined that an error is caused by a particular defect in a specific component. Consequently, an error record is created to document the relationship between the error and the particular defect in the specific component. In one embodiment, the feedback logic 130 identifies which software component caused the reported error by retrieving the error records from a stored location. Each record includes data that links errors to defects in order to determine which component contains the defect corresponding to a reported error. For example, the feedback logic 130 may access records that link errors reported in the software product 110 to defects in the components and subcomponents.

In another embodiment, the feedback logic 130 is configured to perform a technical cause analysis to determine which component has the defect responsible for the reported error. The sub components may have one or more software codes. The technical cause analysis identifies a technical cause at the code level for a defect in a component or subcomponent. As discussed above, various observations of the software product in execution reveal the source of reported errors. Here, a technical cause is a defect in a component at the coding level. Accordingly, in addition to an error being linked to a defect in a component, a record may also include the technical cause of the defect. Therefore, not only can a component or subcomponent be identified, but additionally, the specific code that caused the error in the component or subcomponent can be identified. Thus, the feedback logic 130 uses the feedback data to identify defects in components and sub components. The information about the defects identified by the feedback logic 130 is used to generate a heat map 140 that is stored by the system 100. In one embodiment, the system 100 stores the heat map 140 in a hard drive or a memory.

The feedback logic 130 is configured to generate the heat map 140. The feedback logic 130 organizes the heat map 140 such that regions and sub-regions in the heat map 140 correspond to components and subcomponents in the software product 110 being analyzed. In one embodiment, each component of the software product 110 is assigned to a two dimensional region (e.g., square, rectangle, circle, hexagon) in the heat map 140. The assignments may be made at random, or alternatively, the components and sub-components are known and can be assigned to regions and sub-regions based on information gathered while the software product was being designed. In the illustrated example, the component 111 corresponds to region 141, the component 112 corresponds to region 142, and the subcomponent 113 corresponds to sub-region 143.

Defects found in a component are represented as elements in the regions corresponding to the component. For example, when a defect is found in a component, the feedback logic 110 generates a graphical element and adds the element to the region in the heat map corresponding to the component. Therefore, within each region or sub-region in the heat map 140, there may be a number of elements representing a number of defects. In one embodiment, the elements are also two dimensional shapes (e.g., square, rectangle, circle, hexagon). The graphical elements represent defects of the component corresponding to the region that contains the elements. For example, in FIG. 1, the region 141 is shown to contain 12 elements, specifically elements 151-162. Therefore, since the region 141 contains 12 elements, the component 111, which corresponds to region 141, has 12 defects that have been found. Since a defect is linked to a reported error, the number of elements in a region also corresponds to reported errors. An element may be present in a region to denote that the identified defect has been reported in one or multiple errors. Conversely, an element may be added in a region for every instance of an error that is linked to the defect.

If there are no defects for a component identified from the reported errors, it can be assumed that the component does not contain defects. Therefore, a region corresponding to a component not having any defects will not have any elements. For example, the region 142 does not contain any elements. Therefore, component 112 that corresponds to region 142 does not have any defects that have been identified. However, sub-region 143 is nested within region 142. The sub-region 143 contains 6 elements, specifically elements 163-168. Therefore, the subcomponent 113 corresponding to sub-region 143 has 6 defects associated with reported errors.

Since the sub-region 143 is nested within the region 142 in the heat map 140 (meaning that components are dependent), it can be assumed that the defects of subcomponent 113 affect component 112. The nesting illustrates that the component 112 is dependent on subcomponent 113. Therefore, even if the component 112 itself does not contain any defects, the component 112 is affected by the defects of the subcomponent 113.

After being generated, the heat map 140 is displayed on a display 170. The display 170 may be integrated with the system 100 or configured to work with the system 100. The heat map 140 can be visually assessed in order to determine the relative number of defects in components of the software product 110. In one embodiment, the feedback logic 130 is configured to generate the size of the visual area of a region or sub-region to be directly proportional to the number of defects of the respective component or subcomponent. Thus the size of the visual area increases each time an element is added to the region. Accordingly, the heat map illustrates the relative spread of defects across a constant overall area. For example, the component 111 corresponding to the region 141 has more defects than the subcomponent 113 corresponding to the sub-region 143. This can be visually determined since the elements 151-162 of region 141 have a larger visual area than the elements 163-168 of the sub-region 143. Therefore, defect distribution within the software product 110 can be readily interpreted from the heat map 140 by comparing the areas of the regions and sub-regions. A visual assessment may also reveal how defects in components or subcomponents are interrelated to other components or subcomponents in the hierarchical structure.

Figure 2:
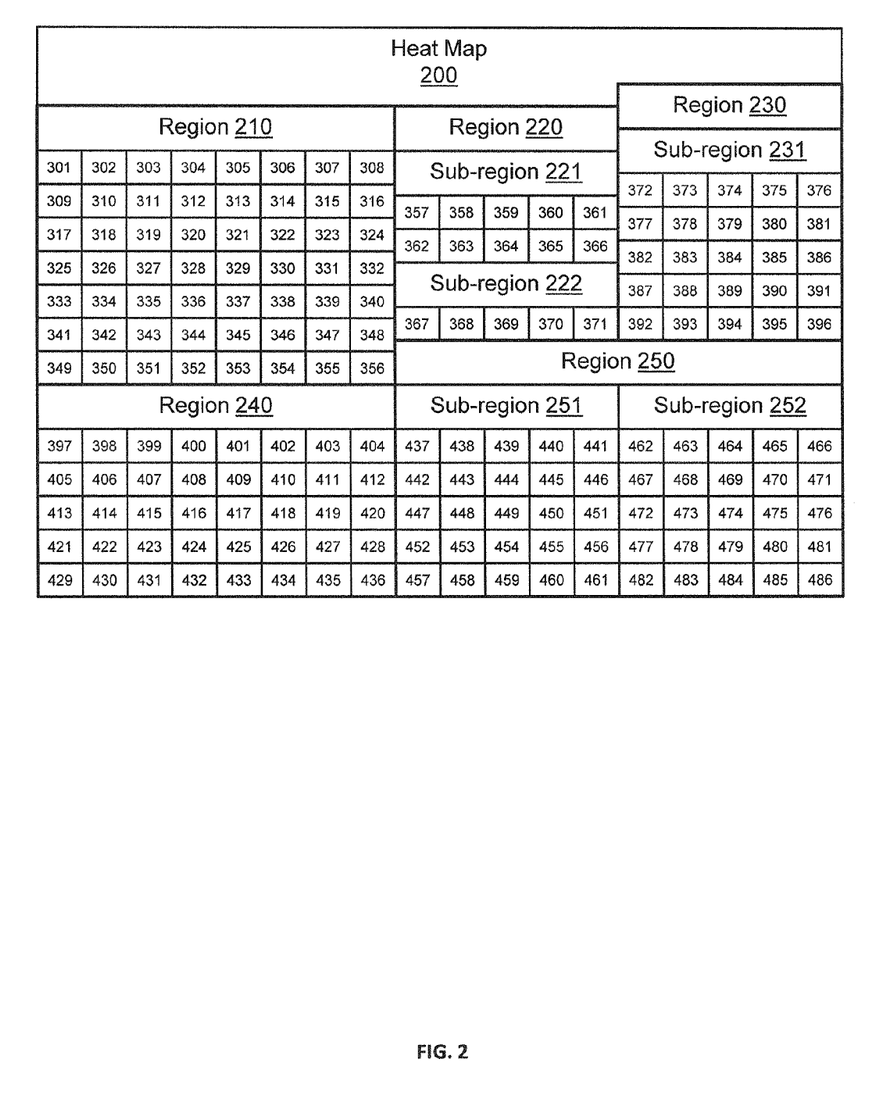
FIG. 2 illustrates one embodiment of a heat map that is associated with communicating defect density.

With reference to FIG. 2, one embodiment of a heat map 200 is shown that may be generated by the present system to communicate defect density in components and/or subcomponents of a software product. For the purposes of explanation, presume that the heat map 200 corresponds to a software product that includes a number of components, as previously described. A region in the heat map 200 is defined for each component in the software product. For example, regions 210, 220, 230, 240, and 250 are defined and assigned to different components. Subcomponents in the software product are assigned to sub-regions in the heat map 200. For example, region 220 has sub-regions 221 and 222. The region 230 has a sub-region 231. The region 250 has sub-regions 251 and 252. More or fewer regions and sub-regions may be used to represent the components and subcomponents.

In one embodiment, when a defect is reported/found in a component, an element is generated and added to the heat map region assigned to that component. The elements contained in the regions and sub-regions represent types of defects found in the corresponding component or subcomponent. Once a defect is identified as being linked to an error, regardless of the number of reported errors that also identify that defect, one element will be used to represent the defect. In other words, one type of defect may cause numerous errors to be reported by users. But, one element is added in the heat map 200 for the one type of defect, not for each error reported. For example, the region 210 contains 56 elements, specifically elements 301-356. Therefore, the component represented by region 210 has 56 different types of defects based on errors reported by users. Accordingly, more than 56 errors may have been reported by users, but only 56 different types of defects were identified and determined from the reported errors.

The entire visual area of the heat map represents a software product and the number of defects is visually represented as a defect density. Specifically, the defect density is illustrated by displaying the number of defects associated with the components and subcomponents of the software product. Accordingly, the number of different defect types affecting a component can be visually assessed by viewing the displayed heat map 200. In another embodiment, an element may represent an occurrence of a defect rather than a type of defect. For example, elements 301 and 302 may represent two different occurrences of the same type of defect.

The elements are illustrated as having numbers to facilitate their description. The elements of a heat map may have distinguishing marks that are not numbers (e.g., letters, pictograms, characters, icons). The elements may be displayed without distinguishing marks. In one embodiment, the elements may be selectable via a graphical user interface such that information about a software defect is displayed when the element is selected. In that regard, the heat map 200 may be displayed as part of a graphical user interface that provides interactive functions with a user.

In one embodiment, visual aspects of the elements 301-486 are generated and displayed to convey various defect metrics such as severity levels, number of defects, age of the defects, and defect occurrence. For example, elements 301-486, as shown in FIG. 2, have a uniform default size. However, the size of an element may be dynamically changed to represent the number of times a defect has occurred. For example, an element that is twice the size of the default size may indicate that the defect has been linked to twice as many reported errors.

The visual size/area of a region (i.e., the amount of space within the boundary of the region) is based on the number of elements the region contains. For example, the visual size/area of region 210 is greater than the visual size/area of any of the other regions. A larger visual area of the region 210 means that there are a greater number of defects in the component represented by region 210 than the number of defects in components represented by the regions 220, 230, 240 or 250. Therefore, the extent of a problem in a component relative to the software product or the other components can be visually assessed by comparing the size/area of a region to other regions, sub-regions, or the heat map as a whole.

In addition to size, a visual aspect of an element may include different colors. In one embodiment, the elements 301-486 displayed in the heat map 200 may have a uniform color or be color coded. In one embodiment, the color coding of the elements 301-486 may indicate the severity of a defect represented by a particular element. For example, defects may be classified into four levels based on the feedback data that details the errors reported by the users. Level one may be assigned the high severity level and level four may be assigned the lowest severity level.

For example, a user may report an amount of disruption caused by an error as the consequences of the error. Suppose that a user operates a manufacturing plant to produce widgets. An error is reported that caused a production shutdown. In the feedback data, the user may include information about the error and its consequences (e.g., the production shutdown). Based on data in the error reported by the user, the defect linked to the error may be classified as a severity level one defect. A defect that results in a minor nuisance, such as clocks in the plant reading the incorrect time, may be classified as a severity level four defect. In one embodiment, the color of a displayed element in the heat map 200 may be changed to represent the severity level of a defect associated with that element.

Alternatively, in the embodiment where a technical cause of a defect is identified as a specific line of code in a software component, the severity level of a defect may be based on the number of times that the line of code has been altered. For example, lines of code that have been revised more than fifteen times may result in defects being classified as a severity level one. Conversely, lines of code that have been revised less than five times may result in defects being classified as a severity level four. Consider that a line of code responsible for a first defect has been revised fifteen times. The elements representing the defects may be color coded to reflect the severity level of the error. The element representing the first defect that is a severity level one may be assigned a color (e.g., red). Likewise, consider that a line of code responsible for a second defect has been revised less than five times. The element representing the second defect that is a severity level four may be assigned a different color (e.g., light blue).

A defect may also occur in the subcomponents of the software. Therefore, an element representing the defect is included in the sub-region corresponding to the defect. For example in FIG. 2, the sub-region 221, of the region 220, contains 10 elements, specifically elements 357-366 and the sub-region 222 contains 5 elements, specifically elements 367-371. Therefore, the subcomponent represented by the sub-region 221 has 10 defects that have been identified, and the subcomponent represented by the sub-region 222 has 5 defects. The defects may be identified as a reported error of the specified component in feedback data. Alternatively, the vendor of a software product may have mapped specific defects to particular components and subcomponents.

FIG. 3 illustrates another embodiment of a heat map 600 that is generated to communicate defect density in components and/or subcomponents across versions of a software product. Specifically, the relative number of defects of the components and subcomponents can be visually assessed for different versions of a software product. Suppose the software product has a first version and a second version. Vendors typically attempt to correct defects from one version to a next version. The heat map 600 illustrates the defect density by component in a first version 601 adjacent to a second version 602 to help a user visualize changes between versions of the software product. Although two versions are illustrated, numerous versions could be displayed in this manner.

In the example illustrated, the heat map 600 illustrates the first version 601 having components represented by the regions 210, 220, 230, 240 and 250. As discussed above with respect to FIG. 2, components 220, 230, and 250 have sub-regions. The second version 602 has regions 210, 220, 240, and 250. A user can visually assess the changes between one software version to another version. For example, in the first version 601, the component represented by region 210 has 56 defects, as discussed above with respect to FIG. 2. In the second version 602, region 210 contains elements 487-528, and therefore the component represented by region 210 in the second version 602 has 41 defects. Accordingly, the number of defects in the component represented by region 210 has been reduced from 56 defects to 41 defects from the first version to the second version of the software. The reduction of defects can be quickly visually assessed by the reduced area of region 210 from the first version 601 to the second version 602.

Components and sub-components that do not contain defects are not represented by regions or sub-regions in the heat map. Therefore, if a component in a first version of the software product has defects, and that component no longer contains defects in the second version of the software product, then the component is not shown in the heat map for the second version. For example, in the first version 601, the region 220 has sub-regions 221 and 222. However, in the second version 602, the region 220 has a single sub-region, sub-region 221. Thus, the absence of sub-region 222 from the second version 602 indicates that there are no longer defects associated with the subcomponent represented by sub-region 222. Accordingly, a visual comparison of the first version 601 and the second version 602 illustrates that the defects of the subcomponent represented by sub-region 222 have been corrected. Likewise, region 230, having sub-region 231, is shown in version 601 but is not shown in version 602. Accordingly, it can be determined that since region 230 is not shown in the heat map of the second version 602, the component represented by region 230 no longer has defects (e.g., no errors were reported from users).

Components which are not represented in the first version of a heat map because the component does not have defects may be subsequently represented in the second version if the component has acquired defects since the first version. For example, in the first version 601, region 250 has sub-regions 251 and 252. However, in the second version 602, the region 250 has a new sub-region, sub-region 253. Because sub-region 253 is not shown in the first version 601, the subcomponent represented by the sub-region 253 did not have defects corresponding to reported errors in the first version 601 of the software product. However, the subcomponent represented by the sub-region 253 has 12 defects. Specifically, the sub-region 253 contains elements 571-582 in the second version 602. Therefore, the defects of the subcomponent represented by sub-region 253 were introduced in the second version 602 of the software product. By representing different versions adjacent to one another on a single heat map, a user can visually assess whether the number of defects are increasing or decreasing between different versions in the software product, components of the software product, and/or subcomponents of the components.

Figure 4:
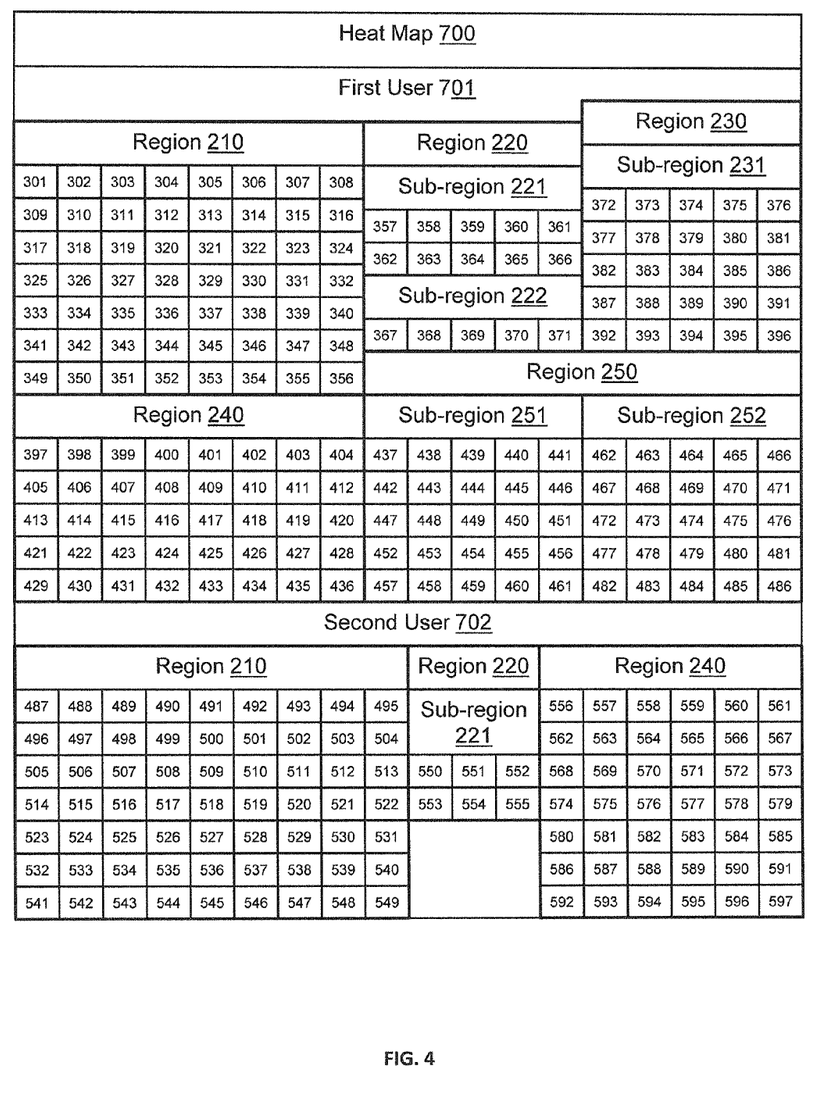
FIG. 4 illustrates one embodiment of a heat map associated with communicating defect density in components and/or subcomponents of the software product from different users.

With reference to FIG. 4, another embodiment of a heat map 700 is illustrated that is generated to communicate defect density in components and/or subcomponents of the software product from different users. Software products are typically distributed to a number of users. A vendor may wish to track the errors that the users encounter in order to determine which components and subcomponents are causing the most trouble. Likewise, by tracking the errors that user's encounter, a vendor may be able to predict errors that other customers that use the software product in a similar manner will encounter. Moreover, a vendor could use this information to proactively correct the predicted errors for other users.

In FIG. 4, a heat map is generated for a first user 701 and a second user 702 who are both using the same software product. Thus the heat map 700 shows the same regions with the same reference numbers. For simplicity in this disclosure, the same regions and sub-regions as shown in FIG. 2 are used in the other heat map examples. For example, the heat map 700 illustrates the software product having components represented by the regions 210, 220, 230, 240, and 250 used by the first user 701. Additionally, the heat map 700 illustrates the software product having regions 210, 220, and 240 of the software product used by the second user 702. Although two users are illustrated, numerous users could be displayed in this manner.

A user can visually assess the errors reported by the first user 701 as compared to the errors reported by the second user 702. As can be seen in heat map 700, the component represented by region 210 has the most defects of any component for both the first user 701 and the second user 702. For example, for the first user 701, the component represented by region 210 has 56 defects. For the second user 702, the component represented by the region 210 contains 62 defects, specifically, elements 487-549. In one embodiment, a person viewing the heat map 700 can determine that the component corresponding to region 210 has incurred more errors than the other components. The determination is made by virtue of the relative visual area of the regions 210 to the other regions. Accordingly, the number of defects in the component represented by region 210 has likely had the largest effect on the users of the software product. Thus, the vendor may choose to correct the component represented by region 210 before correcting defects in other components. Accordingly, the vendor can prioritize their efforts to repair software components based on which software components are affecting the users' experience the most.

As explained previously, FIG. 3 illustrates a heat map 600 displaying adjacent versions of a software product and FIG. 4 illustrates a heat map 700 displaying defects encountered by different users. In other embodiments, a heat map may be generated to display other metrics associated with the software product. For example, the heat map may display the software product by locations of users. For example, the heat maps may be arranged so that users in the same geographic area are displayed adjacently. This type of arrangement may be helpful to a vendor who wishes to determine if users in North America are experiencing the same defects as users in Europe.

Figure 5:
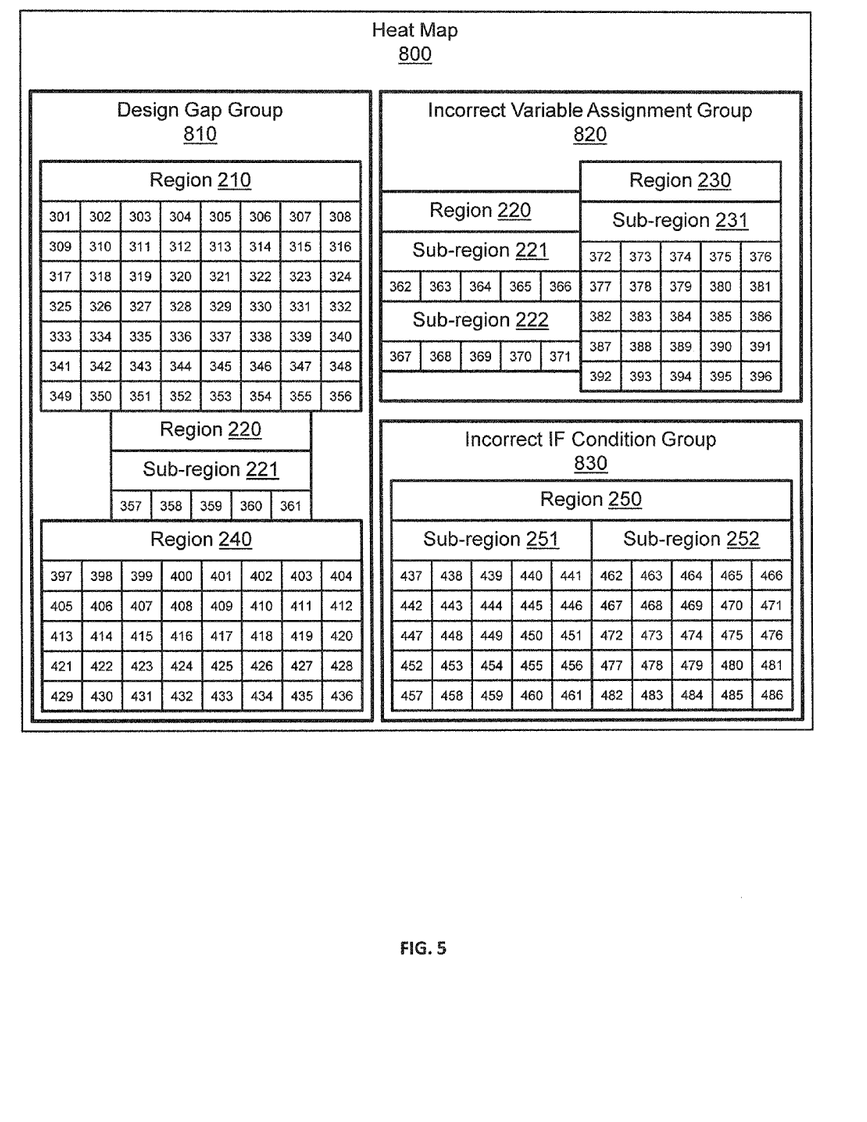
FIG. 5 illustrates one embodiment of a heat map that is associated with illustrating defects based on technical cause analysis.

FIG. 5 illustrates another embodiment of a heat map 800 that is associated with communicating defect density based on technical cause analysis. A heat map may be arranged such that regions having elements that represent similar defects are grouped together. By arranging regions and sub-regions that have elements representing similar defects together, it can be visually assessed what types of defects are causing the most problems in a software product.

As discussed above with respect to FIG. 1, technical cause analysis identifies a root cause at the code level for a failure in a component or subcomponent. Specifically, a root cause of the defect in a component is traced to specific lines of code of the component. Different types of coding errors can be categorized into groups of defects. For example, components can be identified as having defects within a specific group of coding errors. This can provide insight for programmers so that the programmers can determine what lines of code or changes to code are causing the defects.

The heat map 800 is organized and displayed as groups of technical causes for defects. Examples include a design gap group 810, an incorrect variable assignment group 820, and an incorrect IF-Condition group 830. The groups represent types of technical causes for defects at the code level in components and subcomponents. Groups 810, 820, and 830 are exemplary of problems that a programmer of the software product may desire to analyze. Of course, other types of groups of technical causes may be included in the heat map 800. Other examples of technical causes may include new requirement, incorrect join conditions, incorrect variable declaration, incorrect or missing parameter value in function call, constraint error, improper built in command usage and/or other types of programming errors.

A technical cause group is displayed in the heat map 800 as a two dimensional object containing regions and sub-regions. As explained previously, each region is assigned for a component in the software product and each sub-region is assigned to a sub-component of the component. For example, the design gap group 810 contains the regions 210, 220, and 240. The region 220 includes sub-region 221. The incorrect variable assignment group 820 includes the regions 220 and 230. The region 220 includes the sub-regions 221 and 222, and the region 230 includes the sub-region 231. The incorrect IF condition group 830 includes the region 250 having the sub-regions 251 and 252.

The regions and sub-regions have elements corresponding to defects that have a technical cause defined by the group. The region 210 is nested within the design gap group 810. Since the region 210 is contained within the design gap group 810, the defects corresponding to the elements 301-356 have a technical cause based on a design gap at the code level in the component corresponding to the region 210. Likewise, the region 220 containing the sub-region 221 having the elements 357-361 is shown in the design gap group 810. Therefore, these 5 elements in the sub-region 221 also correspond to defects caused by a design gap at the code level in the sub-component corresponding to the sub-region 221.

The incorrect variable assignment group 820 contains region 220 and the sub-region 221, which also appear in the design gap group 810. This represents that the software component associated with region 220 has defects from multiple technical causes. Thus the region (and any of its sub-regions) may appear in multiple groups in the heat map 800. The incorrect variable assignment group 820 contains the elements 362-366 in the sub-region 221. Therefore, while the defects represented by elements 357-361 of the sub-region 221 are caused by a design gap, the defects represented by elements 362-366 of the sub-region 221 are caused by an incorrect variable assignment at the code level in the subcomponent corresponding to the sub-region 221. Therefore, the different technical causes of defects can be visually discerned for components and subcomponents.

Figure 6:
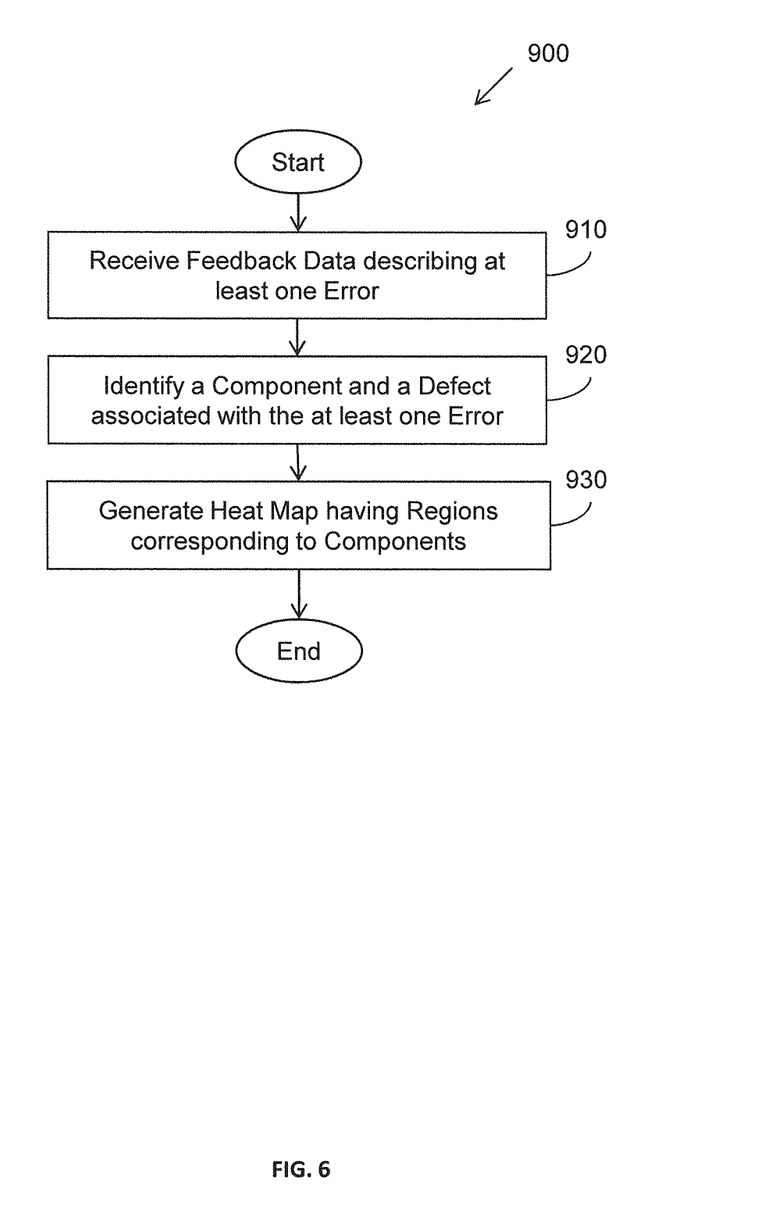
FIG. 6 illustrates one embodiment of a method for generating a heat map that is associated with communicating defect density.

FIG. 6 illustrates one embodiment of a method 900 for generating a heat map that is associated with communicating defect density. At 910, feedback data is received from users of a software product. The feedback data provides information about errors that the users have experienced while using a software product. For example, the feedback data may describe the activity that the software product was engaged in when the error occurred. The feedback data may also include error metric information, such as the severity level of the error, the number of times that the error occurred, or how long the user has been experiencing an error. The feedback data may be collected from users. Alternatively, the feedback data may be automatically received from the software product when the software product generates the error.

At 920 a record is retrieved that links an error to a defect in a component of the software product. In one embodiment, errors are assigned identifiers. The identifier is mapped to a defect that is associated with the error. The defect may be linked to a technical cause in a component. Alternatively, the defect may be linked to the error, because the error causes the defect in the component.

At 930 a heat map is generated based on the linked errors to represent the identified defects. The heat map may be generated in accordance with any of the previously described examples. The generated heat map is displayed on a display screen allowing a user to visually identify which software components have the most defects. Alternatively, the generated heat map may be outputted in a hardcopy form (e.g., printed copy).

Figure 7:
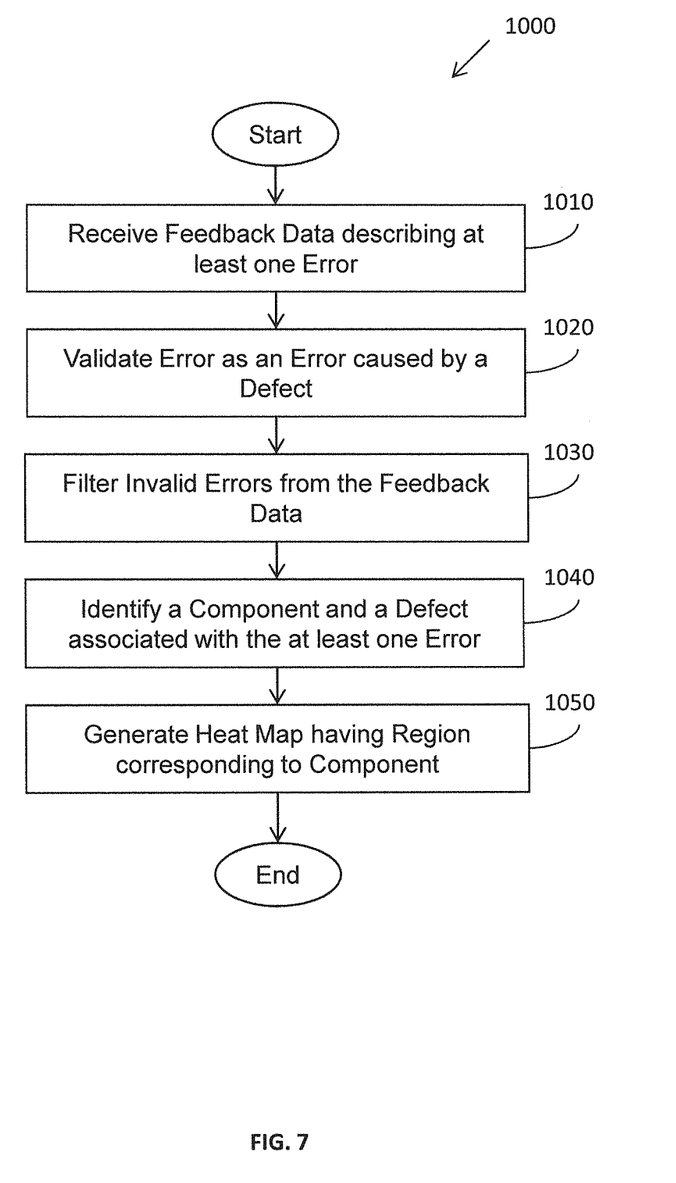
FIG. 7 illustrates one embodiment of a method for generating a heat map that is associated with validating errors.

FIG. 7 illustrates one embodiment of a method 1000 for generating a heat map and includes functions for validating reported errors. For example at 1010, feedback data that describes at least one error is received from users of a software product as previously described. However, some users may report perceived problems with the software product that are actually the result of misuse of the software product or an unrealistic expectation of the abilities of the software product. These instances are reported as errors but are not the result of a defect in the software product. Therefore, at 1020, the feedback data and the reported errors are validated to determine if the error is in fact caused by a defect in the software product.

In one embodiment, the reported error is compared with known errors that have been documented for the software product. If the error is attributed to a specific technical cause, the error would be validated because there is a documented technical cause of the error. Also consider that an error may be linked to a particular defect in a component. Because the error has been linked to a specific defect, the error is validated. Conversely, if an error does not have a technical cause, the error may not have been the result of a problem with the software. Instead, the error may have been caused by a user using the software product incorrectly. In one embodiment, reported errors are validated by accessing a technical cause database and performing technical cause analysis to determine whether a reported error has a technical cause.

In another embodiment, reported errors are classified as internal or external errors. Internal errors are errors reported by the vendor of the software product. These errors may be reported as a result of the vendor testing the software product to locate defects. External errors are reported by third parties (e.g., users, customers). Internal errors may be automatically validated, whereas external defects may require additional analysis to validate.

At 1030, reported errors that cannot be validated are filtered out of the customer feedback data. At 1040, previously stored records of errors are searched to find a record associated with the reported error. If a match is found, the record is retrieved. As previously described, each record includes data that links an error to at least one defect in a component of the software product. Thus the retrieved record identifies the software component that has been experiencing the reported error and the type of defect that is causing the error. At 1050, a heat map is generated, as previously described, but the defects displayed are only based on the validated errors. Also as previously described, the size of the visual area of regions in the heat map is based on the number of elements that the region contains.

Figure 8:
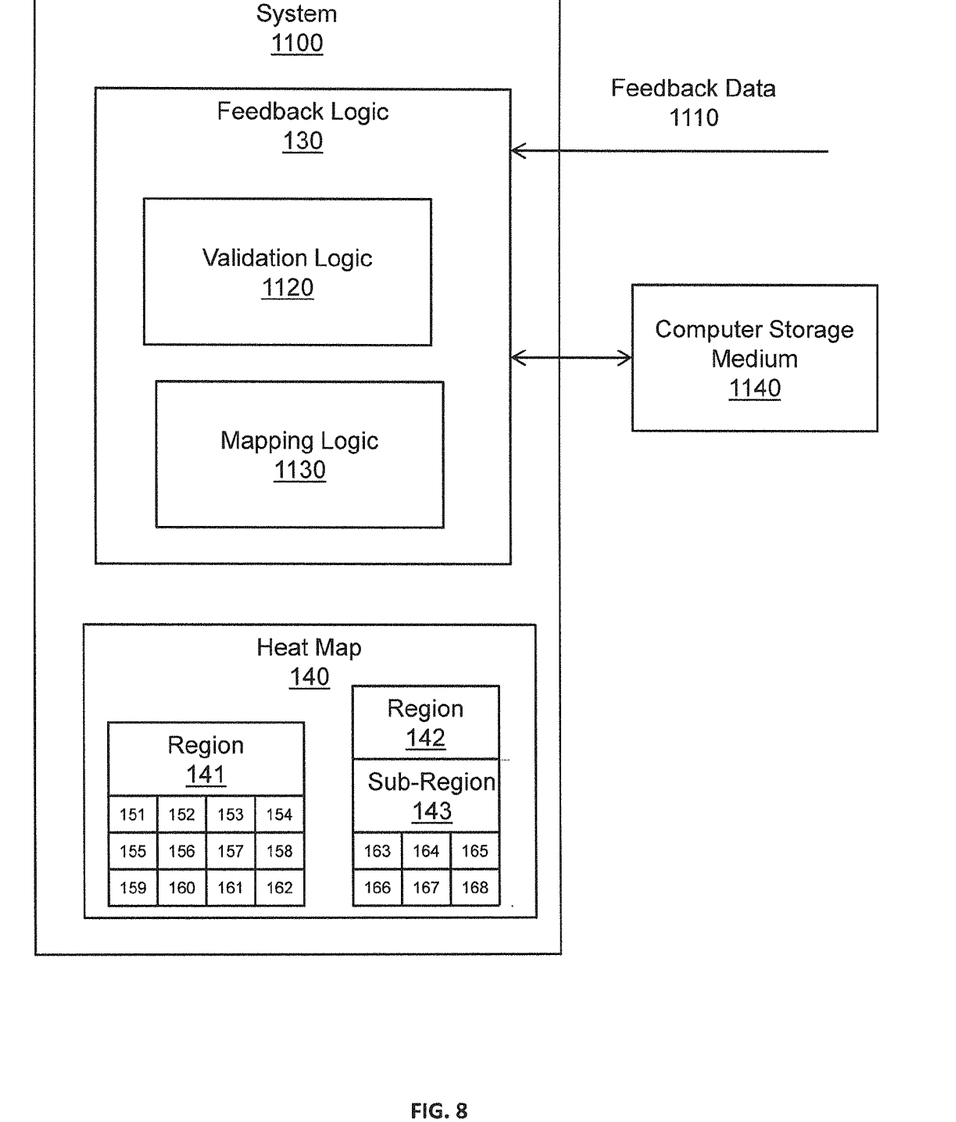
FIG. 8 illustrates one embodiment of a system configured with a feedback logic associated with communicating defect density.

FIG. 8 illustrates one embodiment of a system 1100 configured with the feedback logic 130 of FIG. 1. As previously described, feedback logic 130 is configured to generate heat map 140 that communicates defect density of a software product. The system 1100 may be a computing device used to execute or process a software product (not shown). The feedback logic 130 includes validation logic 1120 and mapping logic 1130, which are configured to access computer storage medium 1140. Feedback data about the use of the software product is received and collected by the feedback logic 130 as feedback data 1110. The feedback data 1110 includes reported error data that identifies an error as well as metadata about the error. For example, the metadata regarding the error may include how the software product was being used when the error occurred, the time the error occurred, and the identity of the user of the software product when the error occurred. The feedback data 1110 may be received from users, the software product, the vendor, or other entities interacting with the software product. Validation logic 1120 is configured to validate the reported errors.

In one embodiment, the validation logic 1120 validates the reported error to ensure that the reported error did in fact occur and that a defect in the software product was responsible for the reported error. Suppose that a user uses the software product incorrectly and therefore the software product does not function correctly. The user may perceive the fact that the software product did not function correctly to be the result of an error. However, in reality, the user, not the software product, was responsible for the software product not functioning as expected. In one embodiment, the feedback data 1100 is used to validate the error. For example, the validation logic 1120 may analyze metadata present in the feedback data 1100 regarding the error to determine to if the software product was being used correctly.

In another embodiment, the validation logic 1120 determines if a record is available for an error. Records are stored in computer storage medium 1140. In one embodiment, the computer storage medium 1140 includes a database of error records. The records link errors to defects as previously described. If a record is available in the computer storage medium 1140 that links an error to a defect, then the error has been previously determined to have been caused by a defect in the software product. Therefore, based on the availability of the record, the error is validated.

Once an error has been validated, mapping logic 1130 analyzes the feedback data 1110 and identifies defects in the software product at the component level. The mapping logic 1130 accesses records from the computer storage medium 1140 that link errors to defects. Records that link errors in the software product to defects in specified components of the software product are stored and made searchable. For purposes of explanation, consider that feedback data 1110 is received by the feedback logic 130 that identifies an error. The error identified in the feedback data 1110 is used to retrieve a record about the error and determine if a defect in the software product resulted in the error occurring. A record links a specific error to a corresponding defect. Alternatively, a record may link an error to several possible defects. In one embodiment, the mapping logic 1130 uses feedback data 1110 about multiple errors to identify a defect.

In the event that the validation logic 1120 has determined that a record is available for an error, the mapping logic 1130 accesses the record in the computer storage medium 1140 identified by the validation logic 1120. The feedback logic 130 then generates the heat map 140. The feedback logic 130 organizes the heat map 140 based on defects identified in the records as previously described.

Figure 9:
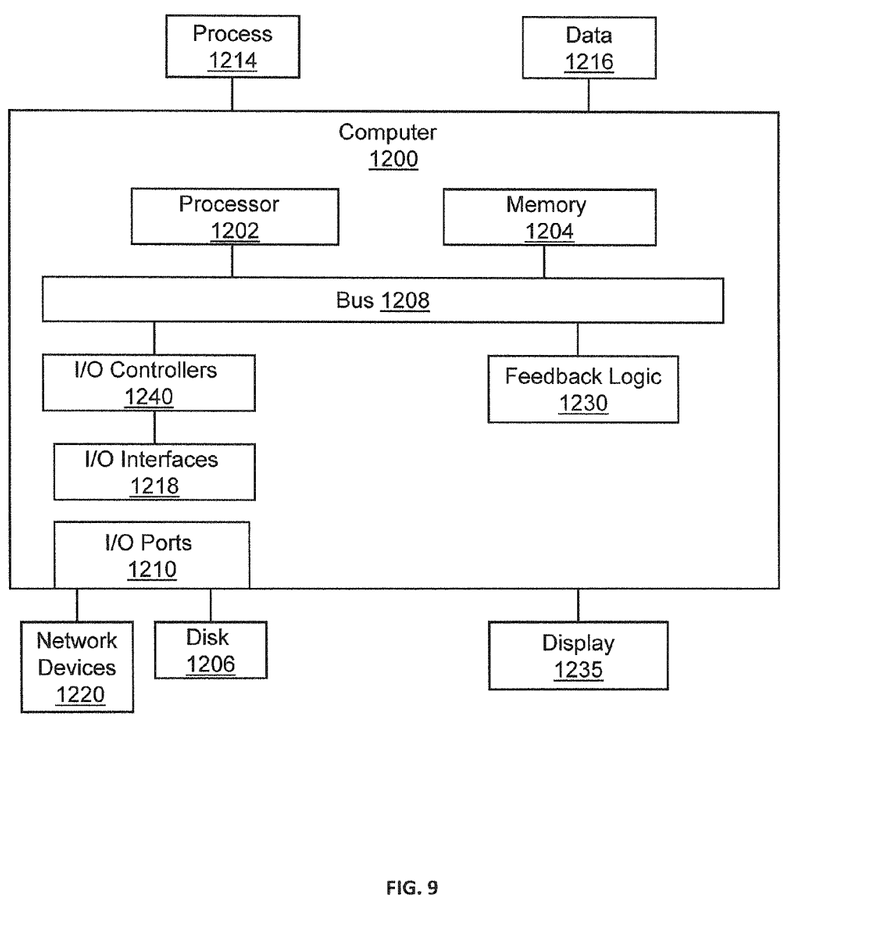
FIG. 9 illustrates an embodiment of a computing system configured with the example systems and/or methods disclosed.

FIG. 9 illustrates an example computing device that is configured and/or programmed with one or more of the example systems and methods described herein, and/or equivalents. The example computing device is a computer 1200 that includes a processor 1202, a memory 1204, and input/output ports 1210 operably connected by a bus 1208. In one example, the computer 1200 is configured with feedback logic 1230 this is configured to facilitate analysis of user feedback similar to feedback logic 130 shown in FIG. 1. The feedback logic interprets feedback from users as feedback data and displays the feedback data as a heat map on display 1235. In different examples, the feedback logic 1230 may be implemented in hardware, a non-transitory computer-storage medium with stored instructions, firmware, and/or combinations thereof. While the feedback logic 1230 is illustrated as a hardware component attached to the bus 1208, it is to be appreciated that in one example, the feedback logic 1230 could be implemented in the processor 1202.

In one embodiment, the feedback logic 1230 or the computer is a means/structure (e.g., hardware, non-transitory computer-storage medium with a stored algorithm, firmware) for performing the functions described herein such as identifying defects in the components and subcomponents of a software product based on feedback data. The feedback logic 1230 or the computer is a means for mapping errors generated by the software product to defects in the components and subcomponents. In another embodiment, the feedback logic 1230 performs a technical cause analysis to determine the source of a defect. Additionally, the feedback logic 1230 validates error as being the result of a defect in the software product.

The means/structure may be implemented, for example, as an ASIC or microprocessor programmed to validate errors and filter out errors that are not validated. The means may also be implemented as stored computer executable instructions that are presented to computer 1200 as data 1216 that are temporarily stored in memory 1204 and then executed by processor 1202.

Feedback logic 1230 may also provide means (e.g., hardware, non-transitory computer-storage medium that stores executable instructions, firmware) for assigning color values to elements representing the defects in displayed heat map on the display 1235.

Generally describing an example configuration of the computer 1200, the processor 1202 may be a variety of various processors including dual microprocessor and other multiprocessor architectures. A memory 1204 may include volatile memory and/or non-volatile memory. Non-volatile memory may include, for example, ROM, PROM, and so on. Volatile memory may include, for example, RAM, SRAM, DRAM, and so on.

A storage disk 1206 may be operably connected to the computer 1200 via, for example, an input/output interface (e.g., card, device) 1218 and an input/output port 1210. The disk 1206 may be, for example, a magnetic disk drive, a solid state disk drive, a floppy disk drive, a tape drive, a Zip drive, a flash memory card, a memory stick, and so on. Furthermore, the disk 1206 may be a CD-ROM drive, a CD-R drive, a CD-RW drive, a DVD ROM, and so on. The memory 1204 can store a process 1214 and/or a data 1216, for example. The disk 1206 and/or the memory 1204 can store an operating system that controls and allocates resources of the computer 1200.

The computer 1200 may interact with input/output devices via the i/o interfaces 1218 and the input/output ports 1210. Input/output devices may be, for example, a keyboard, a microphone, a pointing and selection device, cameras, video cards, displays, the disk 1206, the network devices 1220, and so on. The input/output ports 1210 may include, for example, serial ports, parallel ports, and USB ports.

The computer 1200 can operate in a network environment and thus may be connected to the network devices 1220 via the I/O interfaces 1218, and/or the I/O ports 1210. Through the network devices 1220, the computer 1200 may interact with a network. Through the network, the computer 1200 may be logically connected to remote computers. Networks with which the computer 1200 may interact include, but are not limited to, a LAN, a WAN, and other networks.

In another embodiment, the described methods and/or their equivalents may be implemented with computer executable instructions. Thus, in one embodiment, a non-transitory computer-storage medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated. The methods described herein are limited to statutory subject matter under 35 U.S.C. §101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-storage medium", as used herein, is a non-transitory medium that stores instructions and/or data. A computer-storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-storage medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. Computer-storage medium described herein are limited to statutory subject matter under 35 U.S.C. §101.

"Logic", as used herein, includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic as described herein is limited to statutory subject matter under 35 U.S.C. §101.

"User", as used herein, includes but is not limited to one or more persons, computers or other devices, or combinations of these.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims, which satisfy the statutory subject matter requirements of 35 U.S.C. §101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer storage medium having instructions stored thereon for execution by a device, the non-transitory computer storage medium comprising:
   instructions configured to receive feedback data that describes errors reported from a software product, wherein the software product includes components;
   instructions configured to retrieve records associated with the errors reported, wherein a record links an error to a defect in a component from the software product; and
   instructions configured to generate a heat map having regions, wherein the regions are assigned to represent different components from the software product, wherein the instructions are configured to generate and add graphical elements to a region for each defect identified in a corresponding component, and
   wherein the instructions to generate the heat map include instructions to generate a size of a visual area of each of the regions based, at least in part, on a number of graphical elements contained in the regions, wherein the number of graphical elements in each of the regions corresponds to a number of defects associated with each of the different components from the software product.

2. The non-transitory computer storage medium of claim 1, further comprising:
   instructions configured to classify a severity level of a defect based, at least in part, on the feedback data, and wherein a visual aspect of a graphical element representing the defect corresponds to the severity level.

3. The non-transitory computer storage medium of claim 2, wherein the visual aspect is a color of the graphical element.

4. The non-transitory computer storage medium of claim 2, further comprising:
   instructions configured to determine a number of times a line of code, associated with the defect, has been altered; and
   instructions configured to classify the severity level of the defect corresponding to the graphical element, based, at least in part, on the number of times the line of code has been altered.

5. The non-transitory computer storage medium of claim 1, wherein the region has a sub-region that represents a subcomponent of the component, and wherein the sub-region contains graphical elements representing defects in the subcomponent.

6. The non-transitory computer storage medium of claim 1, further comprising:
   instructions configured to determine whether the error is valid; and
   wherein the errors determined to be valid are linked to defects and are represented as graphical elements in the heat map.

7. The non-transitory computer storage medium of claim 1, wherein the software product has a first version and a second version, and wherein a first region, in the heat map, representing a component of the first version is positioned relative to a second region representing a same component in the second version to facilitate a visual comparison of the first version and the second version of the component.

8. The non-transitory computer storage medium of claim 1, further comprising instructions configured to arrange the regions in the heat map by customer.

9. The non-transitory computer storage medium of claim 1, wherein the defects are classified by a category of defect, and wherein the regions in the heat map are arranged to group the regions having graphical elements representing defects with the same category of defect.

10. A computing system, comprising:
    a processor;
    feedback logic configured to be executed by the processor to:
      (i) receive feedback data from at least one user about a software product having components, wherein the feedback data includes errors reported by the at least one user,
      (ii) link the errors reported to defects in the components from the software product, and
      (iii) generate a heat map including regions representing components from the software product, wherein a region contains elements corresponding to the defects in a component, wherein a size of a visual area of the region is based, at least in part, on a number of elements contained in the region, and wherein the number of elements in the region corresponds to a number of defects associated with a component of the region; and
    a display configured to display the heat map.

11. The computing system of claim 10, wherein the feedback logic is further configured to classify a severity level of a defect based, at least in part, on the feedback data, and wherein a visual aspect of the element representing the defect corresponds to the severity level.

12. The computing system of claim 11, wherein the visual aspect is a color of the element.

13. The computing system of claim 11, where the feedback logic is further configured to:
    (i) determine a number of times a line of code associated with the defect has been altered; and
    (ii) classify the severity level of the defect corresponding to the element, based, at least in part, on the number of times the line of code has been altered.

14. The computing system of claim 10, wherein the region has a sub-region that represents a subcomponent of the component; and wherein the sub-region contains elements representing defects in the subcomponent.

15. The computing system of claim 10, where the feedback logic is further configured to determine whether an error is valid; and wherein an error determined to be valid is linked to defects and is represented as an element in the heat map.

16. A computer implemented method comprising:
    receiving feedback data that reports errors experienced from a software product, wherein the software product includes a plurality of components;
    identifying a component from the software product associated with the reported error by retrieving error records, wherein an error record links an error to a defect in the component from the software product; and generating and displaying a heat map including regions, wherein the regions are assigned to represent different components from the software product;

wherein the generating includes adding graphical elements to a region for each defect identified in a corresponding component, wherein a size of a visual area of the region is a function of a number of defects associated with the component, and wherein generating the heat map includes increasing the size of the visual area for each graphical element added to the region according to the number of defects.

17. The computer implemented method of claim 16, further comprising:

determining a severity level of the defect based, at least in part, on the feedback data, and changing a visual aspect of the element representing the defect according to the severity level.

18. The computer implemented method of claim 17, further comprising:

determining a number of times a line of code associated with the defect has been altered; and classifying the severity level of the defect corresponding to the element based, at least in part, on the number of times the line of code has been altered.

19. The computer implemented method of claim 16, wherein the region is displayed in the heat map with a sub-region that represents a subcomponent of the component; and wherein the sub-region contains elements corresponding to defects in the subcomponent.

20. The computer implemented method of claim 16, further comprising:

determining whether the reported error is valid; wherein reported errors determined to be valid are linked to defects and are represented as elements in the heat map.

* * * * *